April 23, 1963 J. A. COTA 3,086,607
POWER STEERING MECHANISM
Original Filed Sept. 4, 1957 2 Sheets-Sheet 1

JOHN A. COTA
INVENTOR.

BY John R. Faulkner

ATTORNEYS

April 23, 1963 J. A. COTA 3,086,607
POWER STEERING MECHANISM
Original Filed Sept. 4, 1957 2 Sheets-Sheet 2

JOHN A. COTA
INVENTOR.

BY John R. Faulkner

ATTORNEYS

United States Patent Office 3,086,607
Patented Apr. 23, 1963

3,086,607
POWER STEERING MECHANISM
John A. Cota, Dearborn, Mich., assignor to Ford Motor Company, Dearborn, Mich., a corporation of Delaware
Original application Sept. 4, 1957, Ser. No. 682,044, now Patent No. 2,955,667, dated Oct. 11, 1960. Divided and this application Feb. 24, 1960, Ser. No. 10,600
3 Claims. (Cl. 180—79.2)

This invention relates generally to a power steering mechanism for motor vehicles, and particularly to a power steering mechanism incorporating means for damping vibrations.

This application is a divisional application of co-pending application Serial No. 682,044, filed September 4, 1957, now U.S. Patent No. 2,955,667, for Power Steering Mechanism.

In the usual worm type steering mechanism, the worm gear unit is irreversible or at least semi-irreversible, and consequently is effective to dampen vibrations originating at the road wheels so that the vibrations will not be transmitted to the vehicle and particularly to the steering wheel. In other types of steering mechanisms, however, such as the type utilizing a rack and a pinion gear unit, the mechanism does not have irreversible characteristics, and consequently road vibrations are more readily transmitted to the steering wheel. It is therefore an object of the present invention to incorporate in a steering mechanism means damping these vibrations.

A further object of the invention is to provide a hydraulic power steering mechanism effectively damping vibrations during a power steering stroke yet relieving the damping action during the recovery stroke of the steering mechanism so as not to interfere with a smooth and rapid recovery from a turn to straight-ahead driving.

Still another object of the invention is to provide a hydraulic power steering mechanism affording damping characteristics during straight-ahead driving without increasing the resistance to turning movements in either direction.

Another object of the invention is to provide a hydraulic power steering mechanism incorporating frictional damping which is actuated hydraulically by the line pressure in the steering system so that the damping will be more effective during power steering movements than during return or recovery movements.

Other objects and advantages of the invention will be more apparent as this description proceeds, particularly when considered in connection with the accompanying drawings in which.

Figure 2:
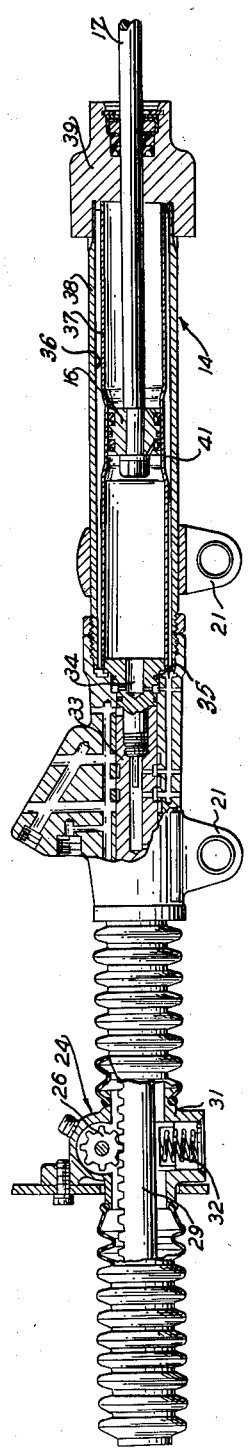
FIGURE 2 is a transverse cross sectional view through the power steering mechanism shown in FIGURE 1.
Figure 1:
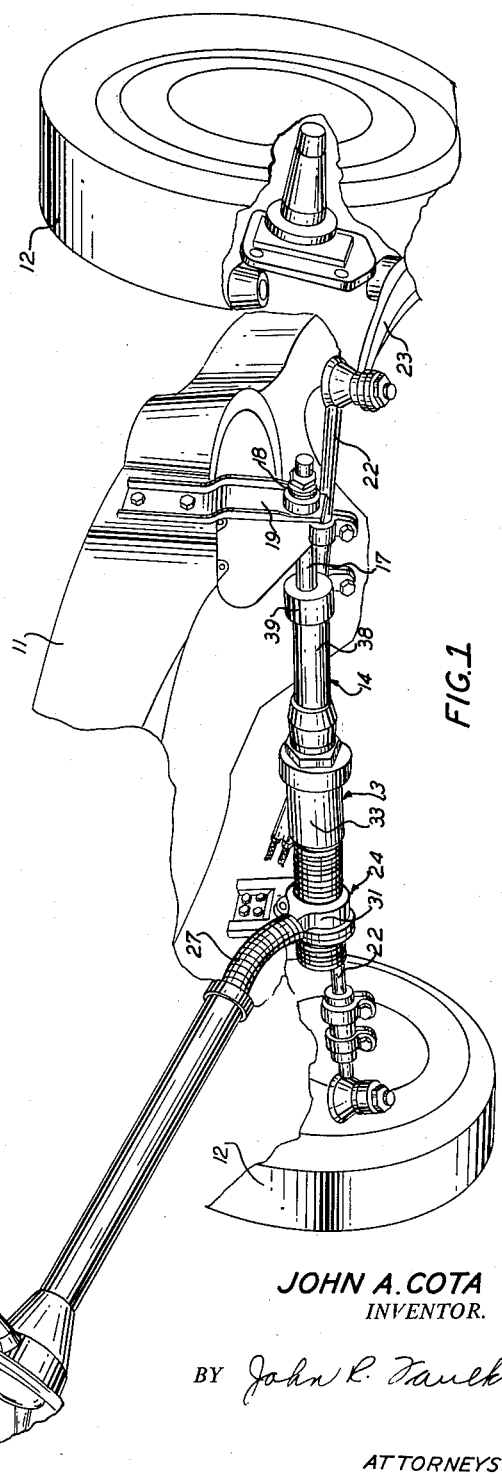
FIGURE 1 is a fragmentary perspective view of a power steering mechanism incorporating the present invention.
Figure 3:
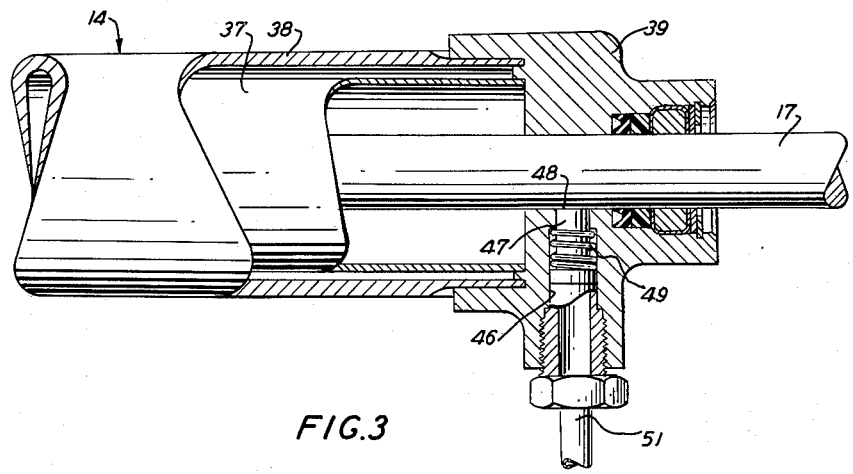
FIGURES 3 and 4 are enlarged cross sectional views through modifications.

Referring now to the drawings, and particularly to FIGURES 1, 2 and 3, the reference character 11 indicates a vehicle frame having front road wheels 12 conventionally supported thereon. The road wheels 12 are adapted to be steered by means of a power steering mechanism 13 including a hydraulic cylinder 14 and a piston 16 reciprocable thereon. The piston 16 is mounted at one end of a connecting rod 17 which in turn is anchored by means of rubber mounts 18 to a frame bracket 19.

Flanges 21 are carried by the cylinder 14 and are connected to oppositely extending tie rods 22 which in turn are connected to steering arms 23 to conventionally steer the vehicle in accordance with transverse movement of the power steering cylinder 14.

Various types of actuating mechanism may be employed, but in the present instance there is shown a rack and pinion type steering gear 24 incorporating a pinion 26 connected by means of a flexible cable drive 27 to a steering wheel 28. The pinion engages a rack 29 extending through the gear housing 31. A spring biased friction member 32 is carried by the housing and engages the rack to take up play between the rack and pinion.

The rack 29 is connected to conventional power steering valve mechanism 33 carried at one end of the cylinder 14. Manual movement of the rack 29 by actuation of the steering wheel is effective through the valve 33 to direct fluid pressure from a suitable source (not shown) to one end or the other of the power steering cylinder 14. In the present instance, fluid is supplied through the passage 34 to the near end of the cylinder, while the end of the cylinder on the opposite side of the piston 16 is supplied through a port 35 and an annular passageway 36 formed between the inner and outer cylinders 37 and 38 respectively which, in the present construction, form the power steering cylinder 14. An end cap 39 closes the end of the cylinder, and provides a bearing for the piston rod 17.

FIGURE 3 illustrates a modification which applies frictional resistance directly to the piston rod 17 to dampen vibrations. In this modification, the end cap 39 of the cylinder assembly 14 is provided with a stepped bore 46 extending radially with respect to the piston rod 17. A friction plunger 47 is received within the bore 46, and has an end face 48 adapted to frictionally engage the periphery of the piston rod 17. A coil spring 49 urges the friction plunger 47 in a direction away from the piston rod 17.

A conduit 51 provides communication from the high pressure line of the power steering system to subject the head of the friction plunger 47 to the fluid pressure in the system. During a turn, the line pressure is sufficient to overcome the spring 49, and to urge the friction plunger 47 into friction engagement with the piston rod 17 to provide friction damping. The line pressure is reduced, however, during the recovery stroke of the steering mechanism, and the spring 49 is selected of such strength to be capable of overcoming the reduced line pressure at this time so that the friction plunger 47 will be moved away from the piston rod 17. Consequently, the friction damping is removed during the recovery stroke so that the return movement of the mechanism will not be impaired.

Figure 4:
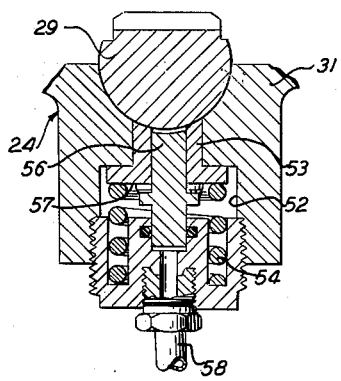

FIGURE 4 illustrates a somewhat similar modification as applied to the rack and pinion steering gear 24. In this construction, the housing 31 of the steering gear is formed with a stepped bore 52 receiving a hollow friction plunger 53 urged by a spring 54 into frictional engagement with the lower surface of the rack 29. This plunger functions in the manner of the friction member 32 shown in FIGURE 2 to take up play between the rack and pinion.

Additional frictional resistance may be provided, however, by means of a central plunger 56 normally urged out of frictional engagement with the lower surface of the rack by means of a spring 57. This spring is, however, adapted to be overcome by line pressure introduced through a conduit 58 during steering movements to apply additional frictional resistance to the rack 29 to dampen vibrations. As in the modification shown in FIGURE 4, the reduced line pressure during recovery strokes is insufficient to overcome the spring 57, and the frictional engagement of the plunger 56 is thus removed at this time.

It will be understood that the invention is not be limited to the exact construction shown and described, but that various changes and modifications may be made without departing from the spirit and scope of the invention, as defined in the appended claims.

I claim:
1. Power steering mechanism for a motor vehicle comprising a cylinder member, a piston member reciprocable within said cylinder member, means connecting one of said members to the frame of the vehicle, means connecting the other of said members to the steerable road wheels of the vehicle to steer the latter, valve mechanism carried by said cylinder member for selectively directing fluid under pressure to said cylinder member on opposite sides of said piston member, a rack connected to said valve member to actuate the latter, a gear housing embracing said rack, a steering wheel, a pinion within said housing actuated by said steering wheel and operatively engaging said rack, a friction element reciprocably mounted within said housing and adapted to engage said rack in a radial direction to dampen vibrations in the power steering mechanism, and a conduit establishing communication between said friction element and the fluid pressure in said power steering mechanism to urge said element into frictional engagement with said rack during power steering turns.

2. The structure defined by claim 1 which is further characterized in that said friction element is in alignment with said pinion, and is urged by fluid pressure in a direction toward said pinion.

3. The structure defined by claim 2 which is further characterized in that a second friction element is reciprocably mounted within said gear housing and is constantly spring biased toward said rack to provide a continuous frictional force upon said rack which is augmented by said first friction element during power steering turns.

References Cited in the file of this patent
UNITED STATES PATENTS

| | | |
|---|---|---|
| 1,115,605 | Snohr | Nov. 3, 1914 |
| 2,755,779 | Muller | July 24, 1956 |
| 2,755,876 | Muller | July 24, 1956 |
| 2,935,150 | Smith et al. | May 3, 1960 |

FOREIGN PATENTS

| | | |
|---|---|---|
| 749,695 | Great Britain | May 30, 1946 |
| 813,312 | Great Britain | May 13, 1959 |